United States Patent
Bushman et al.

(10) Patent No.: US 8,254,785 B1
(45) Date of Patent: Aug. 28, 2012

(54) OPTICAL IMAGE PROCESSING TO WIRELESSLY TRANSFER A VOICE MESSAGE

(75) Inventors: Serge J. L. Bushman, Overland Park, KS (US); Michael Gailloux, Overland Park, KS (US); Carl Joseph Persson, Olathe, KS (US); Thomas Henry Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 826 days.

(21) Appl. No.: 12/120,749

(22) Filed: May 15, 2008

(51) Int. Cl.
*H04B 10/00* (2006.01)

(52) U.S. Cl. ......... 398/118; 398/115; 398/135; 398/140

(58) Field of Classification Search .......... 398/115–117, 398/132, 135–139, 140
See application file for complete search history.

(56) References Cited

U.S. PATENT DOCUMENTS

| | | | | |
|---|---|---|---|---|
| 5,802,179 | A * | 9/1998 | Yamamoto | 380/51 |
| 5,873,735 | A * | 2/1999 | Yamada et al. | 434/316 |
| 5,992,748 | A * | 11/1999 | Takahashi et al. | 235/462.04 |
| 6,203,069 | B1 | 3/2001 | Outwater et al. | |
| 6,264,106 | B1 | 7/2001 | Bridgelall | |
| 6,332,575 | B1 * | 12/2001 | Schuessler et al. | 235/462.13 |
| 6,415,108 | B1 * | 7/2002 | Kamishima et al. | 396/312 |
| 6,513,017 | B1 | 1/2003 | Howard et al. | |
| 6,724,921 | B2 * | 4/2004 | Yamaguchi | 382/118 |
| 6,816,075 | B2 | 11/2004 | Grunes et al. | |
| 6,947,571 | B1 | 9/2005 | Rhoads et al. | |
| 6,961,555 | B1 | 11/2005 | Philyaw | |
| 6,993,573 | B2 | 1/2006 | Hunter | |
| 7,024,109 | B2 * | 4/2006 | Horii et al. | 396/429 |
| 7,068,170 | B2 | 6/2006 | Green | |
| 7,088,859 | B1 * | 8/2006 | Yamaguchi et al. | 382/181 |
| 7,121,469 | B2 | 10/2006 | Dorai et al. | |
| 7,149,000 | B1 * | 12/2006 | Sakai et al. | 358/3.28 |
| 7,181,066 | B1 | 2/2007 | Wagman et al. | |
| 7,190,835 | B2 | 3/2007 | Durbin et al. | |
| 7,222,791 | B2 | 5/2007 | Heilper et al. | |
| 7,274,931 | B2 | 9/2007 | Harris | |
| 7,370,800 | B2 * | 5/2008 | Moroto | 235/462.1 |
| 7,523,866 | B2 | 4/2009 | Longacre, Jr. et al. | |
| 7,634,065 | B2 * | 12/2009 | Fukunaga et al. | 379/88.13 |
| 7,835,037 | B2 * | 11/2010 | Koide | 358/474 |
| 2001/0056359 | A1 | 12/2001 | Abreu | |
| 2002/0052211 | A1 | 5/2002 | Kim et al. | |

(Continued)

FOREIGN PATENT DOCUMENTS

EP 0645728 3/1995

(Continued)

OTHER PUBLICATIONS

PROJECTRESPONDER.COM, "Medical Alert Bracelet," May 8, 2008, 3 pages, http://www.projectresponder.com/medical-alert-bracelet~139.htm.

(Continued)

*Primary Examiner* — Agustin Bello (57) ABSTRACT

An image encodes a voice message and communication data for delivery of the voice message. A wireless communication device optically receives and processes the received image to generate image data. The image data represents the voice message and indicates the communication data. The wireless communication device processes the image data, and in response, wirelessly transmits the voice message for delivery based on the communication data.

20 Claims, 7 Drawing Sheets

U.S. PATENT DOCUMENTS

| | | | |
|---|---|---|---|
| 2002/0078363 | A1 | 6/2002 | Hill et al. |
| 2003/0156032 | A1 | 8/2003 | Adams et al. |
| 2003/0229678 | A1 | 12/2003 | Wen et al. |
| 2003/0233432 | A1 | 12/2003 | Davis et al. |
| 2004/0145613 | A1 | 7/2004 | Stavely et al. |
| 2004/0153553 | A1 | 8/2004 | Chotkowski et al. |
| 2005/0011957 | A1 | 1/2005 | Attia et al. |
| 2005/0029354 | A1 | 2/2005 | Frantz et al. |
| 2005/0044179 | A1 | 2/2005 | Hunter |
| 2005/0080681 | A1* | 4/2005 | Ohnishi ............... 705/24 |
| 2005/0173524 | A1 | 8/2005 | Schrader |
| 2006/0002591 | A1 | 1/2006 | Hombo |
| 2006/0020614 | A1 | 1/2006 | Kolawa et al. |
| 2006/0026048 | A1 | 2/2006 | Kolawa et al. |
| 2006/0042139 | A1 | 3/2006 | Mendes |
| 2006/0100925 | A1 | 5/2006 | Finaly |
| 2006/0212938 | A1 | 9/2006 | Suzuki |
| 2007/0061242 | A1 | 3/2007 | Ramer et al. |
| 2007/0061243 | A1 | 3/2007 | Ramer et al. |
| 2007/0061303 | A1 | 3/2007 | Ramer et al. |
| 2007/0083381 | A1 | 4/2007 | Farrell et al. |
| 2007/0133567 | A1 | 6/2007 | West et al. |
| 2007/0150588 | A1 | 6/2007 | Ghadialy et al. |
| 2007/0290045 | A1 | 12/2007 | Cisar |
| 2007/0290499 | A1 | 12/2007 | Tame |
| 2008/0253608 | A1* | 10/2008 | Long et al. ............. 382/100 |
| 2009/0086045 | A1 | 4/2009 | Giebel et al. |
| 2009/0319349 | A1* | 12/2009 | Wu ......................... 705/14.3 |
| 2010/0041968 | A1* | 2/2010 | Meschisen et al. ......... 600/301 |
| 2011/0112840 | A1* | 5/2011 | Sakamoto ................... 704/266 |

FOREIGN PATENT DOCUMENTS

| | | |
|---|---|---|
| JP | 2008090512 | 4/2008 |
| WO | WO-2006107610 | 10/2006 |

OTHER PUBLICATIONS

Jewels et Jim, "Fashionable Medical I.D. Jewelry," May 8, 2008, 1 page, http://www.jewelsetjim.com/.

Xiaoming Zhao, et al., "Integration of Information Technology, Wireless Networks, and Personal Digital Assistants for Triage and Casualty," Telemedicine and e-Health, Aug. 1, 2006, 2 pages, vol. 12, No. 4, Mary Ann Liebert, Inc., New Rochelle, New York, http://www.liebertonline.com/doi/abs/10.1089/tmj.2006.12.466? cookieSet=1 &journalCode=tmj.

USPTO Office Action Summary dated Nov. 23, 2010 from U.S. Appl. No. 12/043,239.

U.S. Appl. No. 12/020,599, filed Jan. 28, 2008.

Jan Harris, "Accelerometers Could Enhance Camera Phone Pictures," Camera Core, Mar. 23, 2007, 3 pages, camera-core.co.uk, http://www.camera-core.co.uk/23-03-2007-accelerometers-could-enhance-camera-phonespictures.html.

Livecycle, "Using Barcode Data in Processes," LiveCycle Workbench ES Help, Nov. 20, 2008, 3 pages, LiveCycle, ttp://livedocs.adobe.com/livecycle/es/wb_help/wwhelp/wwhimpl/common/html/wwhelp.htm? context=Workbench_ES&file=00001152.html.

Pegasus Imaging Corporation, "Using Barcodes in Documents—Best Practices," Barcode Basics, 2007, pp. 1-9, Pegasus Imaging Corporation, http://www.pegasusimaging.com/BarcodesinDocuments-BestPractices.pdf.

Popular Electronics, "Apple Unlocked GSM Cell Phone," Nov. 21, 2008, 3 pages, Popular Electronics, http://www.popularelect.com/index.php?cPath=21_62.

Popular Electronics, "Nokia N82 Unlocked Quad Band GSM 5+ Megapixel Camera Cell Phone," Nov. 21, 2008, 3 pages, Popular Electronics, http://www.popularelect.com/product_info.php? products_id=875&osCsid=d9b4eb6c7150c354f9fc573c748b2c06.

* cited by examiner

OPTICAL IMAGE PROCESSING TO WIRELESSLY TRANSFER A VOICE MESSAGE

TECHNICAL BACKGROUND

Some people wear an item that has medical symbols, such as a bracelet, to indicate medical information to others. When worn, the item provides medical personnel and first responders who assist the person with the medical information. This is especially important when the person is incapacitated.

Some wireless telephones will automatically send an alert message to a third party if an emergency call is placed from the telephone. Some wireless telephones are also able to scan bar codes that include various types of data. The data may direct the wireless telephone to download information from a web site.

These items and wireless telephones have not been effectively configured to efficiently interoperate to provide information and deliver messages.

OVERVIEW

An image encodes a voice message and communication data for delivery of the voice message. A wireless communication device optically receives and processes the received image to generate image data. The image data represents the voice message and indicates the communication data. The wireless communication device processes the image data, and in response, wirelessly transmits the voice message for delivery based on the communication data.

DETAILED DESCRIPTION

Figure 1:
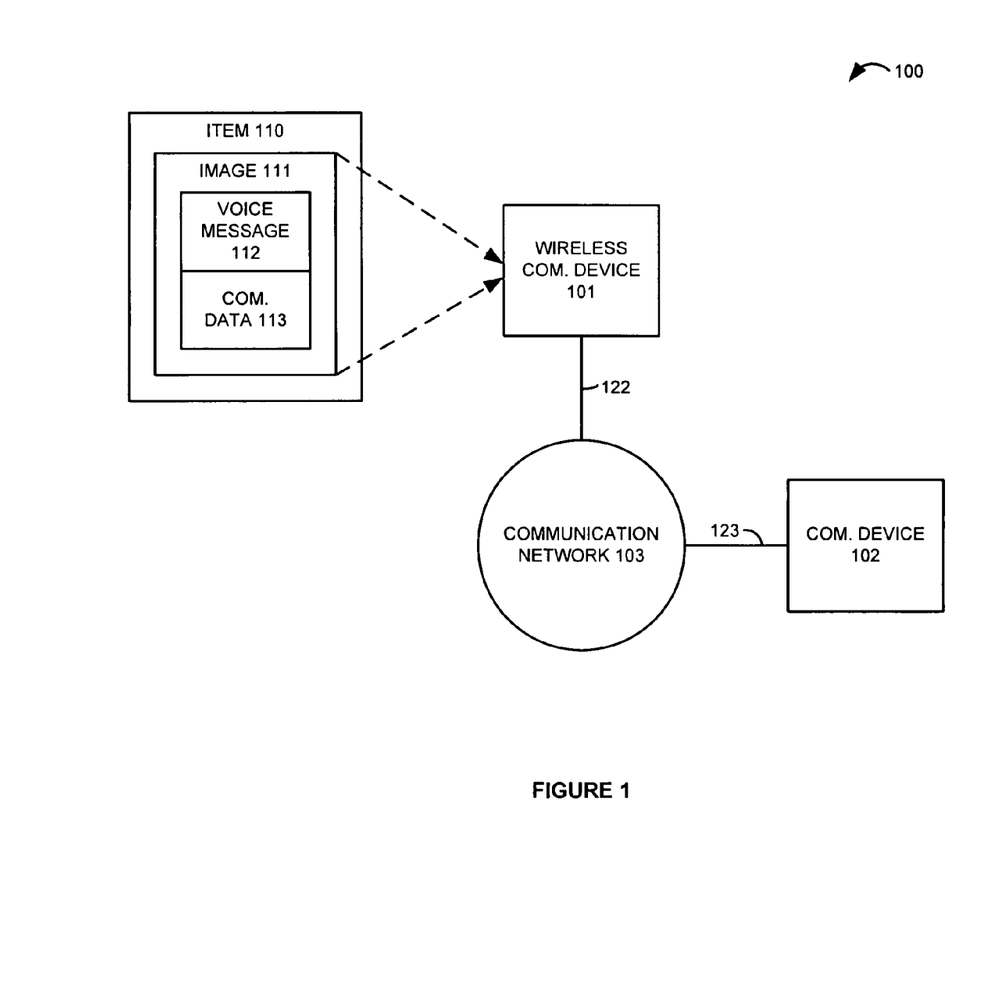
FIG. 1 is a block diagram that illustrates an image-controlled communication system.

FIG. 1 is a block diagram that illustrates image-controlled communication system 100. Image-controlled communication system 100 comprises communication device 101-102, communication network 103, and item 110. Item 110 includes image 111 that encodes voice message 112 and communication data 113. Image 111 may also encode instructions and other data. Examples of item 110 include jewelry, cards, tags, and clothing, although there are other examples. Examples of image 111 include two-dimensional bar codes, pictures, symbols, graphics, and printed data sets, although there are other examples. Voice message 112 could use various forms of voice coding, compression, and fidelity. Communication data 113 could be a telephone number, email address, uniform resource locator, Internet address or some other communication code.

Wireless communication device 103 optically receives image 111 from item 110 as indicated on FIG. 1 by dashed lines. Communication device 101 and communication network 104 wirelessly exchange communications over wireless link 122. Communication device 102 and communication network 103 exchange communications over communication link 123.

Wireless communication device 101 comprises a telephone, transceiver, computer, digital assistant, mobile Internet access device, or some other wireless communication apparatus—including combinations thereof. Wireless communication device 101 has a camera or some other optical receiver. Wireless communication device 102 comprises a Public Service Answering Point (PSAP), operator center, telephone, transceiver, computer, digital assistant, Internet access device, server or some other communication apparatus—including combinations thereof.

Communication network 103 comprises wireless access points, telephony switches, internet routers, network gateways, computer systems, communication links, or some other type of communication equipment—including combinations thereof. Wireless link 122 uses the air as the transport media. Wireless link 122 could use various protocols, such as wireless fidelity, code division multiple access, worldwide interoperability for microwave access, internet, telephony, or some other communication format—including combinations thereof. Communication link 123 uses various communication media, such as air, metal, optical fiber, or some other signal propagation path—including combinations thereof. Communication link 123 uses various protocols, such as internet, telephony, optical networking, wireless communication, wireless fidelity, code division multiple access, worldwide interoperability for microwave access, or some other communication format—including combinations thereof. Links 122-123 could be direct links or they might include various intermediate components, systems, and networks.

Figure 2:
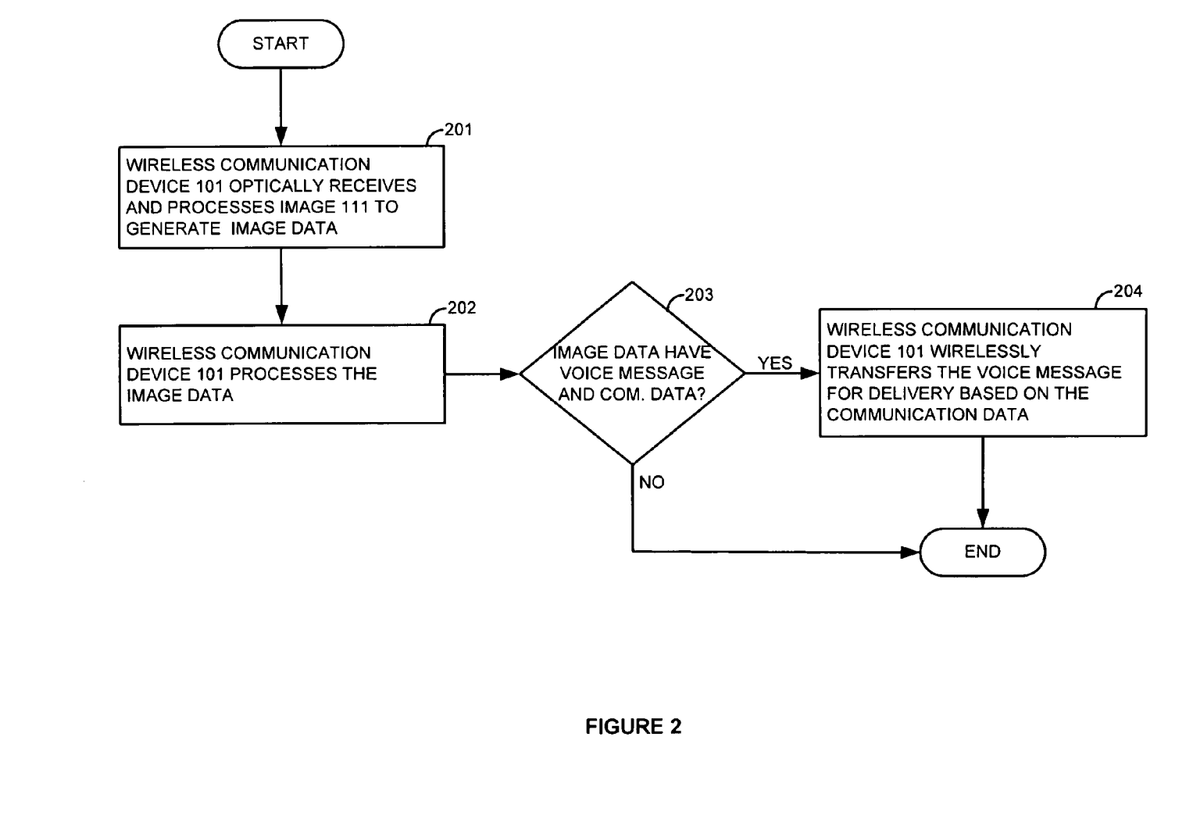
FIG. 2 is a flow diagram that illustrates the operation of the image-controlled communication system.

FIG. 2 is a flow diagram that illustrates the operation of image-controlled communication system 100. The operation starts when wireless communication device 101 optically receives image 111 from item 110 and processes image 111 to generate image data (201). The optical reception and processing of image 111 could be automatic or be responsive to a human input. For example, the user may operate a user interface to direct wireless communication device 101 to take a picture of image 111 and process the received image.

Wireless communication system 101 processes the image data (202). Image data processing could be responsive to a user input or automatic in response to optical reception and processing of the image. If the image data includes voice message 112 and communication data 113 (203), then wireless communication device 101 wirelessly transfers voice message 112 for delivery based on communication data 113 (204). For example, wireless communication device 101 might email a voice file containing voice message 112 to an email address specified by communication data 113. Wireless communication device 101 might transfer a Short Message Service (SMS) voice message to a destination code specified by communication data 113. Wireless communication device 101 might call a telephone number specified by communication data 113 and then play voice message 112 over the call connection. Wireless communication device 101 might transfer a voice file containing voice message 112 to an Internet address or uniform resource locator specified by communication data 113.

In the above example, wireless communication device 101 automatically performed the wireless transfer in response to the presence of voice message 112 and communication data 113 in the image data. Alternatively, image 110 and its corresponding image data may contain an instruction to perform the wireless transfer, and thus, wireless communication device 101 would perform the wireless transfer in response to the processing the instruction in the image data. In another alternative, wireless communication device 101 might perform the wireless transfer in response to a user input authorizing the transfer of the voice message 112 for delivery based on communication data 113.

Figure 3:
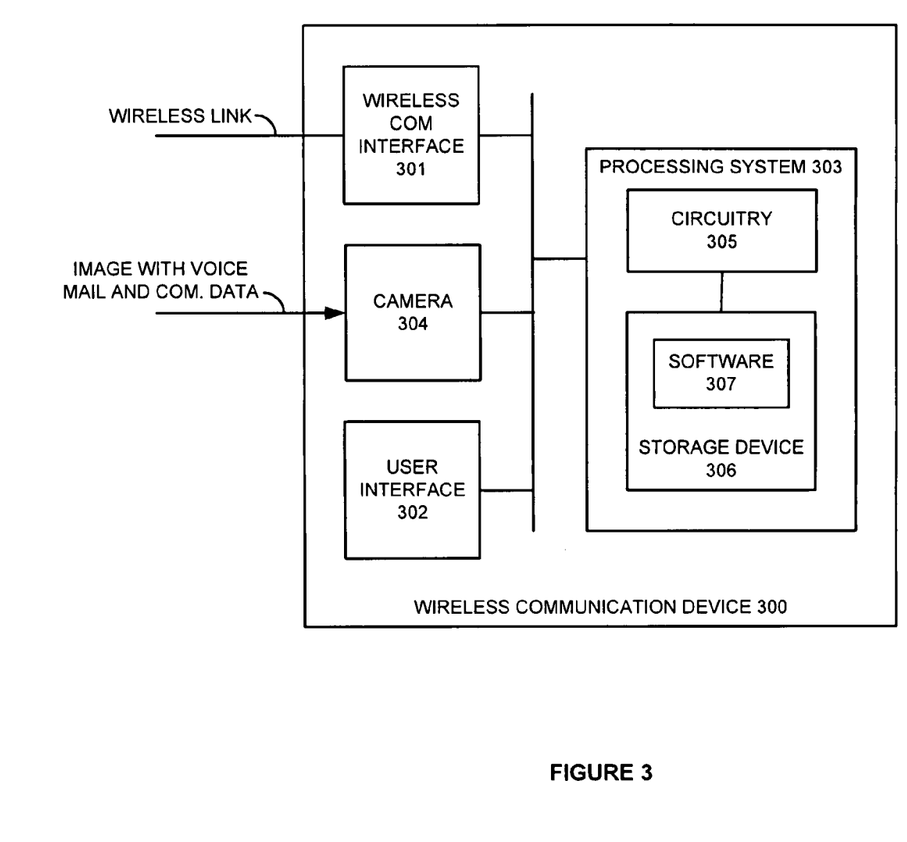
FIG. 3 is a block diagram that illustrates an image-controlled communication system.

FIG. 3 is a block diagram that illustrates wireless communication device 300 that provides image-controlled voice messaging. Wireless communication device 300 comprises wireless communication interface 301, user interface 302, processing system 303, and camera 304. Processing system 303 is linked to wireless communication interface 301, user interface 302, and camera 304. Processing system 303 includes circuitry 305 and storage device 306 that stores operating software 307.

Wireless communication interface 301 comprises components that communicate over a wireless link under the control of processing system 303. Wireless communication interface 301 comprises an RF transceiver and antenna or some other wireless communication device. User interface 302 comprises components that interact with the user under the control of processing system 303. User interface 302 may include a speaker, microphone, buttons, lights, display screen, touch screen, touch pad, scroll wheel, or some other user input/output apparatus. Circuitry 305 comprises microprocessor and other circuitry that retrieves and executes operating software 307 from storage device 306 to control wireless communication interface 301, user interface 302, and camera 304. Storage device 306 comprises a disk drive, flash drive, memory circuitry, or some other memory device.

Operating software 307 comprises computer programs, firmware, or some other form of machine-readable processing instructions. Operating software 307 may include an operating system, utilities, drivers, network interfaces, applications, or some other type of software. When executed by circuitry 305, operating software 307 directs processing system 303 to operate wireless communication device 300 as described herein. In particular, operating software 307 directs processing system 303 to perform the image data processing as described herein.

Camera 304 is configured to optically receive images, convert the optical image into image data, and transfer the image data to processing system 303. Camera 304 operates in response to instructions from processing system 303. For example, the user may provide camera instructions through user interface 302, and in response, processing system 303 would direct camera to optically capture an image and provide the resulting image data to processing system 303. Camera 304 could be a wireless telephone camera or some other optical receiver.

Figure 4:
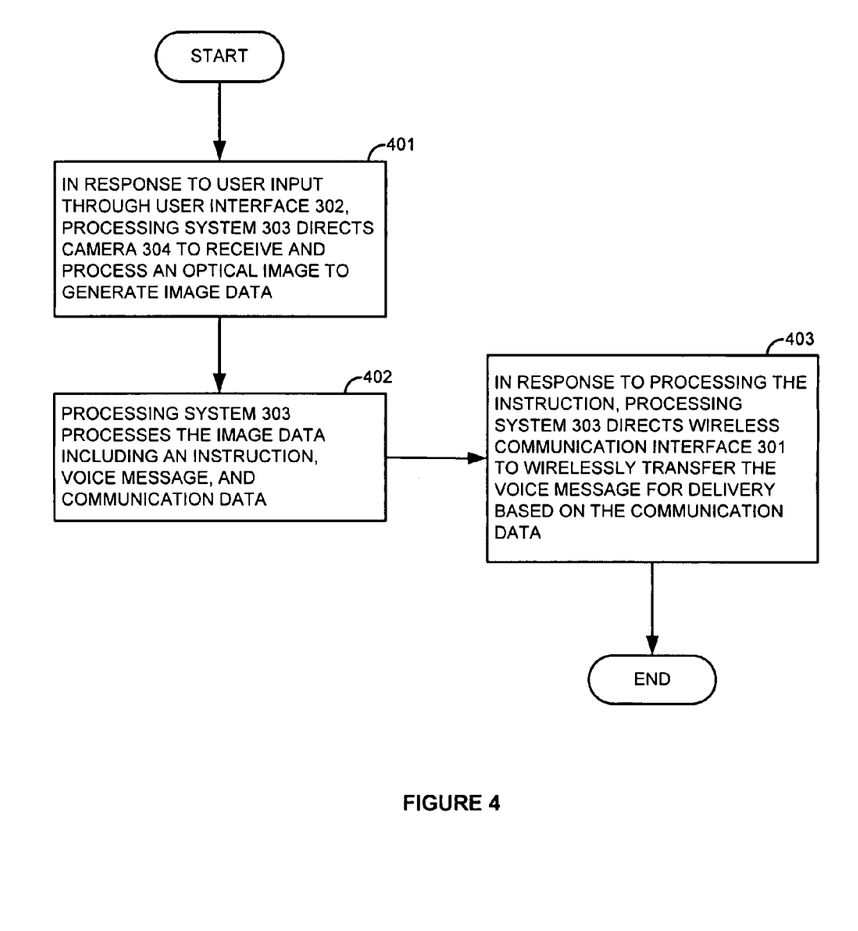
FIG. 4 is a flow diagram that illustrates the operation of the image-controlled communication system.

FIG. 4 is a flow diagram that illustrates the operation of wireless communication device 300 to optically receive and process images to wirelessly transfer voice messages. The operational sequence begins when user interface 302 receives user input for processing system 303, and in response to the user input, processing system 303 directs camera 304 to optically receive and process an image to generate image data (401). The image data includes an instruction, voice message, and communication data. The instruction is configured to direct processing system 303 to transfer the voice message for delivery based on the communication data. Processing system 303 processes the image data (402), and in response to the instruction, processing system 303 directs wireless communication interface 301 to initiate a wireless transfer of the voice message for delivery based on the communication data (403). For example, processing system 303 might direct wireless communication interface 301 to call a telephone number specified by the communication data and then play the voice message over the call connection.

Figure 5:
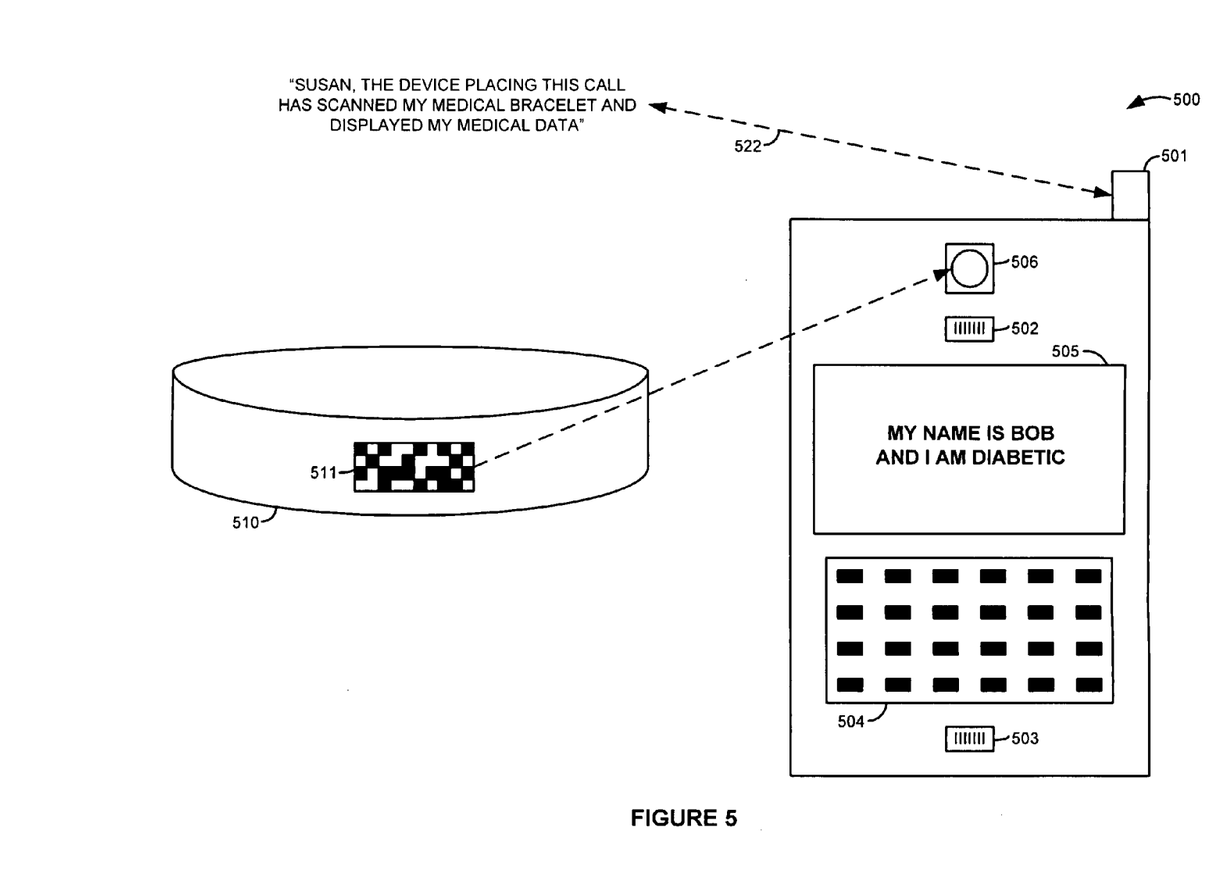
FIG. 5 is a sketch that illustrates a wireless telephone providing image-controlled communications in a medical context.

In some examples, the image encodes medical data. Thus, camera 305 processes the optically received image to generate image data that includes the medical data. Processing system 303 then processes the medical data, and in response, directs user interface 302 to display the medical data. For example, the image could encode a diabetic condition. Camera 305 processes the optically received image to generate image data that indicates the diabetic condition. Processing system 303 then processes the image data, and in response, directs user interface 302 to display the medical data, and in particular, to display the diabetic condition FIG. 5 is a sketch that illustrates wireless telephone 500 providing image-controlled communications in a medical context. Wireless telephone 500 includes antenna 501, speaker 502, microphone 503, keypad 504, display 505, and camera 506. Wireless telephone 500 communicates over wireless link 522. Medical bracelet 510 includes two-dimensional bar code 511.

In this example, a man named Bob is married to a woman named Susan. Bob is diabetic. Bob has recorded the following message in his own voice, "Susan, the telephone placing this call has scanned my medical bracelet and displayed my medical information." Bob wears medical bracelet 510 having two dimensional bar code 511. Two dimensional bar code 511 encodes Bob's pre-recorded voice message and the telephone number for Susan's telephone. Two dimensional bar code 511 also encodes medical data indicating Bob's diabetic condition.

Unfortunately, Bob has a diabetic seizure. Another person who owns wireless telephone 500 finds Bob and operates phone 500 to take a picture of two-dimensional bar code 511 on Bob's medical bracelet 510. Wireless telephone 500 processes bar code 511 to produce corresponding image data having the voice message, telephone number, and medical data. Wireless telephone 500 processes the image data to place a wireless voice call to the telephone number of Susan's telephone. When the call is answered, wireless telephone 500 plays the voice message "Susan, the telephone placing this call has scanned my medical bracelet and displayed my medical information." Wireless telephone 500 also displays the medical information, "My name is Bob and I am diabetic."

Figure 6:
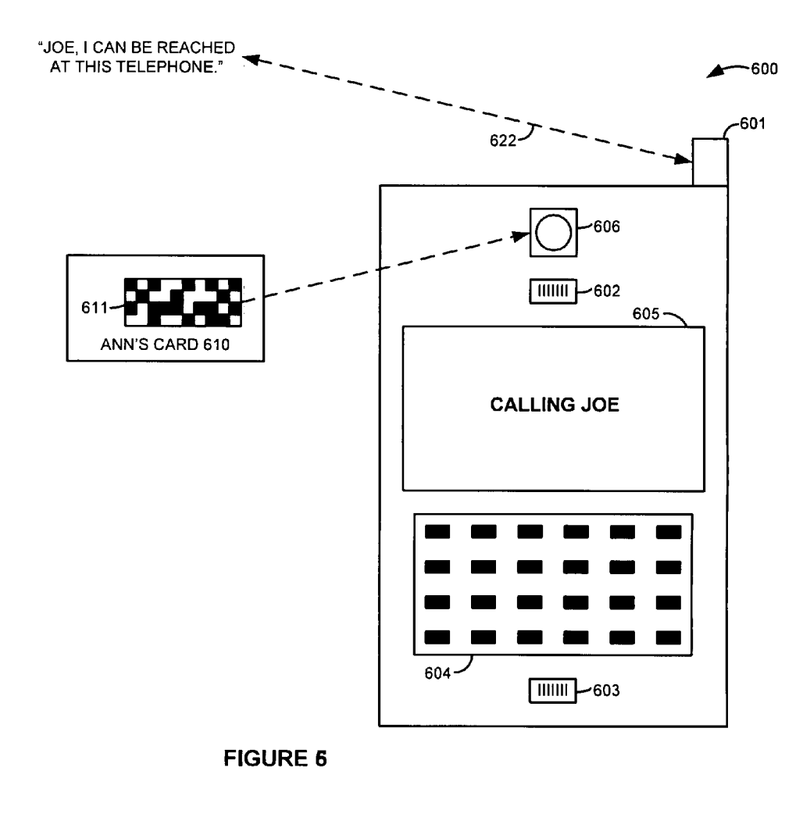
FIG. 6 is a sketch that illustrates a wireless telephone providing image-controlled communications in a shared phone context.

FIG. 6 is a sketch that illustrates a wireless telephone providing image-controlled communications in a shared-phone context. Wireless telephone 600 includes antenna 601, speaker 602, microphone 603, keypad 604, display 605, and camera 606. Wireless telephone 600 communicates over wireless link 622.

In this example, a woman named Ann is married to a man named Joe. Ann has recorded the following message in her own voice, "Joe, I can be temporarily reached at the telephone placing this call." Ann carries card 610 with two-dimensional barcode 611 that encodes an instruction, Ann's pre-recorded voice message, and the telephone number for Joe's telephone.

Ann is visiting a friend who owns wireless telephone 600, but Ann unfortunately left her own wireless telephone behind. Ann's friend operates phone 600 to take a picture of two-dimensional bar code 611 on Ann's card. Wireless telephone 600 processes bar code 611 to produce corresponding image data having the instruction, voice message, and telephone number. Wireless telephone 600 then processes the instruction to place a wireless voice call to the telephone number of Joe's telephone. When the call is answered, wireless telephone 600 plays the voice message "Joe, I can be reached at the telephone placing this call."

Figure 7:
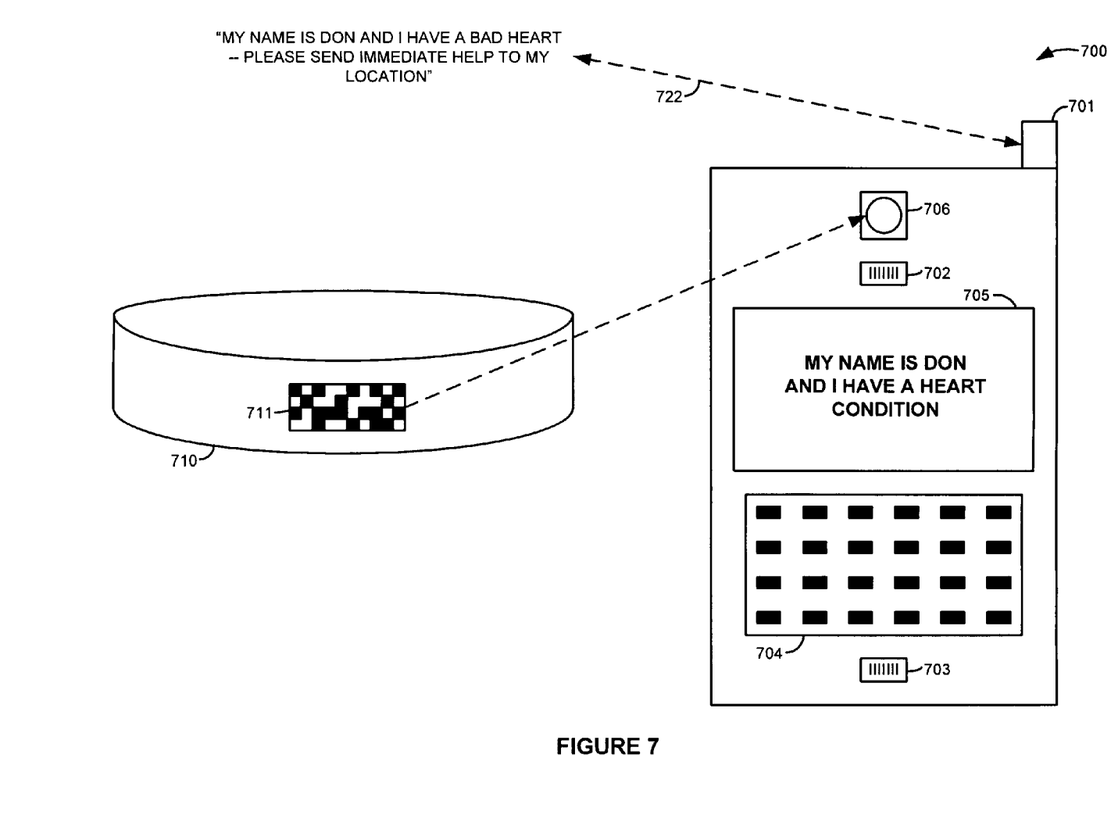
FIG. 7 is a sketch that illustrates a wireless telephone providing image-controlled communications in a medical context.

FIG. 7 is a sketch that illustrates wireless telephone 700 providing image-controlled communications in a medical context. Wireless telephone 700 includes antenna 701, speaker 702, microphone 703, keypad 704, display 705, and camera 706. Wireless telephone 700 communicates over wireless link 722. Medical bracelet 710 includes two-dimensional bar code 711.

In this example, a man named Don has a heart condition that places him at high risk for a heart attack. Don has recorded the following message in his own voice, "My name is Don and I have a bad heart, please send immediate help to my location." Don wears medical bracelet 710 having two dimensional bar code 711 that encodes Don's pre-recorded voice message and an emergency services telephone number, such as 911. Two dimensional bar code 711 also encodes medical data indicating Don's heart condition.

Unfortunately, Don feels the onset of a heart attack. Don quickly operates wireless telephone 700 to take a picture of two-dimensional bar code 711 on Don's medical bracelet 710 (or someone with Don does this). Wireless telephone 700 processes bar code 711 to produce corresponding image data having the voice message, telephone number, and medical data. Wireless telephone 700 processes the image data to place a wireless voice call to the emergency services telephone number. Wireless telephone 700 or the communication network would typically provide Don's location over the emergency service call. When the emergency call is answered, wireless telephone 700 plays the voice message "My name is Don and I have a bad heart, please send immediate help to my location." Wireless telephone 700 also displays the medical information, "My name is Bob and I have a heart condition."

In some examples, the communication networks handling emergency messages in a medical context may waive any communication charges for the owner of the wireless telephone. Although the examples described above for FIGS. 5-7 use wireless telephones, wireless communication devices 101 and 300 could be configured to operate in a similar manner.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device comprising:
    optically receiving an image into the wireless communication device, wherein the image encodes a voice message and communication data, wherein the communication data includes an identifier of a destination for delivery of the voice message over a communication network;
    processing the optically received image to generate image data that represents the voice message and that indicates the communication data for delivery of the voice message over the communication network; and
    processing the image data, and in response, wirelessly transmitting the voice message to the communication network via a wireless access point for delivery to the destination based on the communication data.

2. The method of claim 1 wherein the communication data comprises a telephone number.

3. The method of claim 1 wherein the communication data comprises an email address.

4. The method of claim 1 wherein the communication data comprises a uniform resource locator.

5. The method of claim 1 wherein the communication data comprises an Internet address.

6. The method of claim 1 wherein the communication data comprises an emergency services access number.

7. The method of claim 1 wherein the image comprises a two-dimensional bar code.

8. The method of claim 1 wherein the image encodes an instruction to transmit the voice message for delivery based on the communication data, wherein processing the optically received image to generate the image data comprises processing the optically received image to obtain the instruction, and wherein wirelessly transmitting the voice message in response to processing the image data comprises wirelessly transmitting the voice message in response to processing the instruction.

9. The method of claim 1 wherein the image encodes medical information, wherein processing the optically received image to generate the image data comprises processing the optically received image to obtain the medical information, and further comprising displaying the medical information in response to processing the image data.

10. The method of claim 1 wherein the wireless communication device comprises a mobile Internet access device.

11. A wireless communication device comprising:
    a camera configured to optically receive an image that encodes a voice message and communication data, wherein the communication data includes an identifier of a destination for delivery of the voice message over a communication network, and to process the optically received image to generate image data that represents the voice message and that indicates the communication data for delivery of the voice message over the communication network;
    a wireless communication interface configured to wirelessly transmit the voice message to the communication network via a wireless access point for delivery to the destination based on the communication data; and
    a processing system configured to process the image data to direct the wireless communication interface to wirelessly transmit the voice message to the communication network for delivery based on the communication data.

12. The wireless communication device of claim 11 wherein the communication data comprises a telephone number.

13. The wireless communication device of claim 11 wherein the communication data comprises an email address.

14. The wireless communication device of claim 11 wherein the communication data comprises a uniform resource locator.

15. The wireless communication device of claim 11 wherein the communication data comprises an Internet address.

16. The wireless communication device of claim 11 wherein the communication data comprises an emergency services access number.

17. The wireless communication device of claim 11 wherein the image comprises a two-dimensional bar code.

18. The wireless communication device of claim 11 wherein the image encodes an instruction to transmit the voice message for delivery based on the communication data, wherein the camera is configured to process the optically received image to obtain the instruction, and wherein the processing system is configured to direct the wireless communication interface to wirelessly transmit the voice message in response to processing the instruction.

19. The wireless communication device of claim 11 wherein the image encodes medical information and further comprising a display configured to display the medical information, wherein the camera is configured to process the optically received image to obtain the medical information, and wherein the processing system is configured to direct the display to display the medical information.

20. The wireless communication device of claim 11 wherein the wireless communication device comprises a mobile Internet access device.

* * * * *